UNITED STATES PATENT OFFICE.

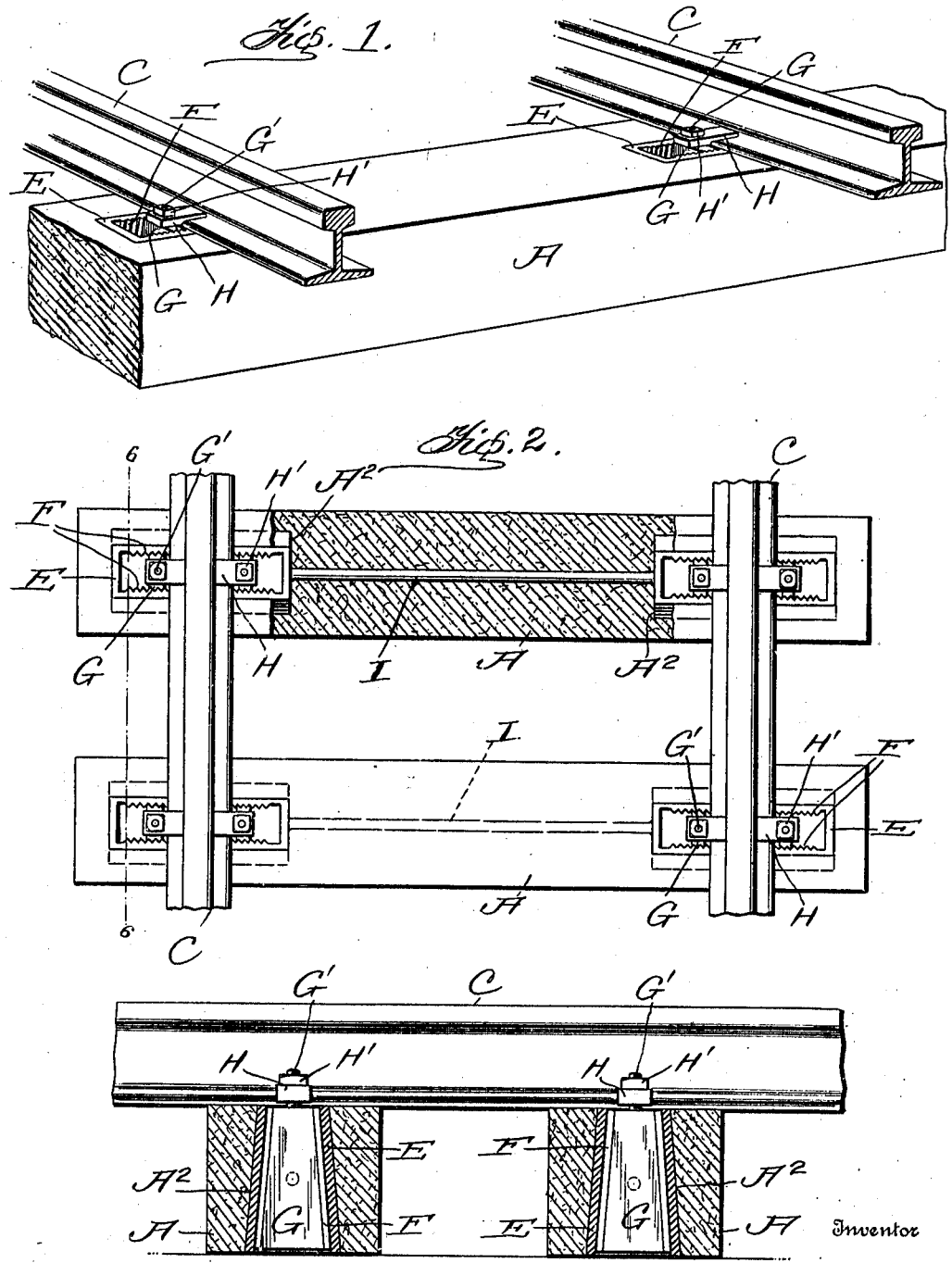

VERNON J. MILLER, OF NEW YORK, N. Y.

RAILROAD-TIE AND FASTENER.

978,470. Specification of Letters Patent. Patented Dec. 13, 1910.

Application filed November 27, 1908. Serial No. 464,705.

*To all whom it may concern:*

Be it known that I, VERNON J. MILLER, a citizen of the United States, residing in New York, in the State of New York, have invented a new and useful Improvement in Railroad-Ties and Fasteners, of which the following is a specification.

This invention relates to an improved construction of rail-road tie and means connected therewith for securely fastening the rails to said tie.

The object of the invention is to provide an exceedingly strong and durable form of tie and an exceedingly simple and efficient construction of fastening device adapted for use in connection with the special form of tie, whereby the rails are securely fastened to the tie, but can be easily disconnected whenever it is necessary to do so.

Another object of the invention is to provide a novel form of fastening device which will entirely prevent the lateral creeping of the rail.

With these various objects in view my invention consists in the novel features of construction, combination and arrangement, all of which will be fully described hereinafter and pointed out in the claims.

In the drawings forming a part of this specification: Figure 1 is a perspective view of an improved form of rail tie and fastener embodying my invention. Fig. 2 is a top plan view of the same partly in section. Fig. 3 is a transverse sectional view on the line 3—3 of Fig. 2, the wedge-bolts, clamps and rail being shown in elevation.

In carrying out my invention I employ a composite rail-road tie A which is preferably made of slag, concrete, cement or similar material, and this tie is made with an opening adjacent each end as shown at $A^2$, said opening extending from the top to the bottom of the tie and it will be noted that this opening is made tapering toward the top. Fitting in these openings $A^2$ are the blocks E and these blocks, it will be noted, are made tapering to fit snugly within the tapered openings, and furthermore it will be noted that they are hollow from top to bottom and have their opposing sides serrated or toothed as shown at F.

Fitting within the hollow serrated blocks E are the wedge-bolts G, the edges of said bolts being serrated or toothed to correspond with the serrations F so that once the wedge bolts are fitted within the hollow blocks or casings it will be impossible to move them laterally, owing to the engagement of the serrations of the bolts engaging the serrations upon the inner faces of the hollow blocks or casings. The extreme end of the wedge-bolt G is reduced and threaded as shown at G', and fitting upon said reduced ends are the clamps H secured by means of nuts H' screwed upon the threaded end G', and it is clear that as these nuts are screwed down firmly upon the threaded ends of the bolts the clamps will be bound firmly to the base of the rail, and the wedge-bolts will be drawn up tightly within the hollow blocks or casings, and there being two wedge bolts used in connection with each hollow block or casing, one on either side of the rail, the said rail will be securely fastened to the composite tie and it being impossible to move the wedge-bolts all danger of lateral movement or shifting of the rail is entirely avoided. Whenever it is desired to change the position of the wedge bolt, the nuts and clamps are removed and the wedge bolt is then forced downwardly a sufficient distance to clear the serrations and it is then shifted the proper direction and then brought up again so as to bring the serrations of the bolt into engagement with the serrations of the hollow block or casing.

It will thus be seen that I provide a simple and highly efficient means for fastening the rail to the tie and in practice I prefer to unite or connect the hollow blocks by means of tie-rods I which not only serve to connect and hold the hollow blocks in place but also serve as a reinforcing bar for the composite tie.

Having thus fully described my invention, what I claim as new and desire to secure by Letters Patent is:—

1. A composite tie having openings adjacent the ends, hollow blocks adapted to fit in said openings, a tie-rod connecting said hollow blocks, wedge-bolts arranged within the hollow blocks and having reduced and threaded upper ends, clamps and nuts arranged upon said threaded ends and means for locking the wedge-bolts within the hollow block, as set forth.

2. A composite tie having tapering openings adjacent its ends, hollow blocks arranged in said openings, adjustable bolts arranged in said hollow blocks, and means carried by said bolts for securing the rails, as set forth.

VERNON J. MILLER.

Witnesses:
CHAS. E. BROCK,
MARY WILKENING.